April 16, 1929.  J. W. HORTON  1,708,945
SELECTIVE TRANSMISSION SYSTEM
Filed Jan. 6, 1922
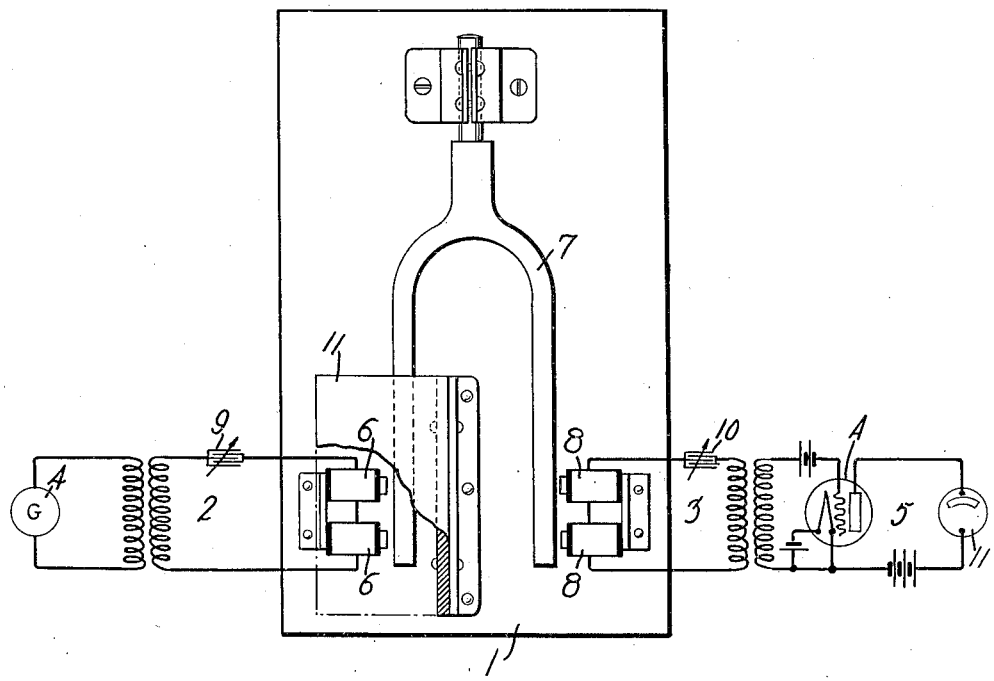
Inventor:
Joseph W. Horton,
by C. C. Sprague.
Atty.

Patented Apr. 16, 1929.

1,708,945

UNITED STATES PATENT OFFICE.

JOSEPH W. HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

SELECTIVE TRANSMISSION SYSTEM.

Application filed January 6, 1922. Serial No. 527,460.

This invention relates to selective transmission systems and particularly to selective systems adapted for measuring or setting the frequency of an electrical circuit.

The principal objects of the invention are to provide a frequency selective transmission system for electrical energy which utilizes the frequency selective characteristics of a resonantly vibrating mechanical means, and to employ a system of this kind in the measurement or setting of the frequency of an electrical circuit.

The system of the invention, in its broadest aspect, is an electrical transmission system containing a vibratory mechanical link or, otherwise considered, two electrical circuits having a vibratory mechanical coupling. This link or coupling has, inherent in itself, or by reason of its relation with elements of its associated circuits, qualities which enable energy to be selectively transmitted therethrough from one circuit to the other. It accordingly embodies means for translating a part of the electrical energy in the input, or primary circuit, into its own mechanical vibratory energy and for retranslating its vibratory energy into electrical variations in the output, or secondary, circuit. The invention embodies means whereby the vibratory link selects that component of the input current corresponding in frequency to its own resonant frequency and reproduces it with fidelity of physical characteristics in the output circuit.

While various expedients may be used to accomplish the energy conversion required, the system of the invention provides an electromagnetic driving means for actuating the vibratory means which, in the specific form to be described, is a tuning fork. A portion of the fork also constitutes, with an adjacent permanent magnet, the magnetic circuit of a coil in the output circuit, in which an electromotive force is generated in response to the vibratory movements of the fork.

An arrangement as just described constitutes a selective transmission system of superior quality as compared with electrical selective circuits e. g. filter or tuned circuit arrangements having the same ultimate function. It may be used for any purpose for which such systems are generally used. One use which is disclosed in this application is to measure or set the frequency which is characteristic of a given source, whether it be a primary energy source or a circuit carrying current of a certain frequency. For this purpose the input coil may be related to said source so as to derive a current therefrom, the output coil being connected in circuit with a rectifier and an electrical indicator. Amplifiers may be inserted as desired. If the indicator is an alternating current meter the rectifier may be dispensed with and the meter directly connected across the output coil. If the frequency of the source is gradually changed, a setting in which the frequency is equal to that characteristic of the selective system, that is, the resonant frequency of the fork, is indicated by a maximum deflection of the indicating instrument. A plurality of such selective systems having different selective characteristics may be sequentially used to determine the fixed frequency of a given source. Or, for the same purpose, the input circuits of a plurality of such systems may be connected to the source either in series or in parallel, a separate output circuit and indicating means being used for each system. In this manner, the energy of the source is simultaneously impressed on the systems, the maximum response occurring in the indicating instrument which is related to that system having the resonance frequency of the source. Additional objects are to mechanically select alternating currents of a given frequency and to measure or set the frequency of an electrical source by virtue of mechanical resonance.

Other features of the invention, the principles of operation, and the particular arrangement which are most desirable will be later explained in greater detail. Among the advantages obtained are the markedly increased selectivity that may be secured by causing a very small amount of energy to be transmitted through the system.

For an explanation of the invention as embodied in a specific form, reference is had to the following description and drawing which shows a preferred form of selective transmission circuit designed for a single frequency.

The drawing illustrates a selective transmission system comprising the mechanical vibratory means 1, coupling the circuits 2 and 3, which constitute input and output circuits, respectively, for the electrical energy, the vibratory means being shown drawn to a larger scale than the other elements to better bring out the structural features of the invention. This selective transmission system may be used to permit electrical energy of a particular frequency determined by the natural frequency of the vibratory means to flow from an electrical source diagrammatically illustrated by 4 to a utilization or absorbing circuit 5.

The mechanical vibratory element 1 and the immediately associated portions of the input and output circuits constitute an arrangement for performing sequentially the following functions: Electrical variations in the input circuit effect corresponding force variations or stresses in the mechanical element, tending to set it into vibration according to the particular modes of electrical variation impressed thereon. The resonant mechanical apparatus is selective at its own natural frequency and accordingly if the input circuit includes an electrical component having this frequency the resonant element will be set into vibration according to this frequency substantially to the exclusion of all other frequencies. The vibrations effect corresponding electrical variations in the output circuit. The combination of the three elements accordingly serves to selectively transmit a particular component of a complex wave from the input circuit to the output and associated circuits. In the particular combination disclosed the variations of current in circuit 2 set up corresponding variations of flux in the magnetic circuit of electromagnet, or input coils, 6. The vibrating element is a tuning fork 7, one arm of which constitutes a portion of this same magnetic circuit. Variations of flux in this magnetic circuit are reproduced as corresponding variations of force in the arm of the fork which, is set into vibration at its natural frequency if a corresponding frequency component is included in the impressed electrical energy, the other arm of the fork vibrating in unison. The vibrations in the other arm, by varying the reluctance of the magnetic circuit formed by the permanent magnet core of output coils 8 and the adjacent portion of the vibrating arm, effect variations in the flux interlinking the coils and accordingly generate electromotive force variations, by generator action, in said coils. Although a permanent magnet source of flux is shown it is obvious that circuit arrangements may be used providing for the excitation of the core by current in the coils 8, in which case the generated impulses of current would be superposed on the exciting current. While it is not essential to the operation of applicant's system to tune the circuits containing the coils, since the selection is primarily accomplished by the vibratory means, tuning these circuits to the frequency which it is desired to select contributes to the result secured, as will be pointed out later. The circuits may be tuned to the desired frequency by means of variable condensers 9 and 10.

The coupling described is one example of the general type which is characterized by reciprocal relationship between the forces and motions in an electrical system and the motions and forces in a mechanical system. The forces acting in the electrical system produce displacements in the mechanical system with a corresponding change in the potential energy of that system. Likewise, the forces acting in the mechanical system produce a displacement of magnetism or of electricity in the electrical system, changing the potential energy of the magnetism or of the electrical charges thereby. The ratio of the force to the resulting displacement is the same in both cases when a uniform system of units such as the C. G. S. system is used to measure all the quantities. In the case of periodic or harmonic variations effective velocities may be substituted for displacements without affecting the correctness of this statement. The transfer of energy is effected by virtue of the variations in the potential energy in one system due to force variations in the other system and a flow of energy therefore may be created between the transmitting source and the receiving device, no energy being supplied to the system from any other source. To describe this type of coupling the term "reciprocal" is proposed and will be used for this purpose in the claims.

Although avoidable under usual conditions, induction between the input and output coils may sometimes occur, on account of the variations of flux in the magnetic circuit formed by the two arms and the air gap therebetween this magnetic circuit being common to the two coils. This would result in the superposition in the utilization circuit of a current having substantially a constant mean value on the current otherwise secured. If the utilization circuit contains an indicator for the purpose of measuring the current transmitted thereto, this indicating instrument would have to be designed for a larger current and its sensitivity for the small but sharply varying changes in mean current as the frequency is varied through the resonance frequency of the fork would be decreased. A magnetic shield 11 may be used to prevent such induction by effectually confining the flux to a single arm of the fork. The shield may be angular as shown, or may have any other desired section, and may partially or totally inclose the arm of the fork and the input coil. The effect in either case is to provide a return path for the flux in the input arm of the fork which has a lower reluctance than the alternative path through the other arm and the air gap.

While the selective system just described above may be used for any purpose for which selective circuits are generally used, it is shown as forming a part of a frequency measuring or setting system. The circuit 4 contains a source of energy G, the frequency of which may be varied through the critical frequency for which the system is adjusted. The circuit 5 under these conditions is an indicating circuit. The indicating instrument 11 may be a telephone receiver in which case it may be connected directly across the output circuit, if the received current is of audible frequency or, preferably across the output of an amplifying device A. If a meter is used, it is preferable to choose a direct current ammeter or voltmeter in which case the device A may be adjusted to rectify the received alternating current. A tuning fork can be used efficiently up to approximately the upper limits of audible frequencies, and may be designed to be used with much higher frequencies. For frequencies above a few thousand it is preferable to use vibrating bars or other mechanical vibrating means having a short natural period.

A selective system of the type above described has been found to be much more selective than an electrical selective circuit. For example, a thousand cycle mechanical vibrating oscillator of a standard make using a tuning fork as the frequency determining means was adapted for the purpose here described, and it was found that, when the fork was vibrated through substantially its normal amplitude (giving an easily visible motion when vibrating at its resonance frequency) by using substantially the normal exciting current in its input coil, the entire resonance curve was contained within a range of two or three cycles at 1000 cycles. From these curves the decrement, as computed in the usual manner, was found to be .003 as compared with the average decrement of .031, of tuned circuits adapted for high selectivity.

A remarkable increase in selectivity can be secured by decreasing the exciting current, the decrement varying approximately as the cube root of the current generated in the output circuit, where the indicating device is placed. An explanation of this phenomenon will be given later. It will be sufficient for the present purpose to point out the particular conditions under which such results have been secured and to give the approximate quantitative relations involved. A 1000 cycle tuning fork of standard design was used the length of the arms being about 3 inches. The electromagnets were each composed of two coils mounted on the usual horseshoe shaped core and approached as closely as practicable to the fork. Each coil was made of 396 turns and had a direct current resistance of about 10 ohms. When in actual use at the resonant frequency of the fork the impedance of the electromagnets was found to vary with the current. With a fairly heavy driving current, roughly corresponding to the conditions under which the .003 decrement was found, the impedance was equivalent to .071 henrys of inductance in series with 400 ohms resistance. As pointed out above, a condenser was inserted for the purpose of offsetting the inductance. For a very light driving current the input impedance was found to be equivalent to .065 henrys of inductance in series with 350 ohms. Tests were made using the smallest practicable exciting current. It was found possible to use a current as low as two milliamperes, somewhat lower than the low current used in the impedance measurements described above and resulting in a vibration too small to be visible. With this current it was found that the entire resonance curve was included in a band of one cycle at 1000 cycles, the calculated decrement being .0006, a decrement of the order of one fiftieth of that of the average decrement of tuned electrical circuits.

Although an explanation of the theory of operation of the invention is not necessary, a preferred explanation of the phenomenon attending the use of a low energy input will be given.

The logarithmic decrement of a circuit is the exponential term in the logarithmic equation expressing the current in an oscillatory circuit, $$i = Ie^{\frac{-Rt}{2L}} \sin \omega t,$$

and is accordingly a logarithmic function of the difference in amplitude of successive waves in a damped wave train, and a measure of the degree of damping. The quantity is important as measuring the relative selectivity of a tuned circuit, a small decrement indicating a correspondingly slow damping and a high selectivity. The quantity R in this equation is an effective resistance and is a composite of all the various energy absorbing functions existing in an alternating current circuit. It is a variable which depends principally on the value of the current. Since the other quantity concerned in the decrement is substantially constant, a relatively large decrease in current would normally tend to reduce to some extent the decrement of the circuit. This is true, to a slight extent, of the electrical portion of the transmission system under consideration.

It is believed, however, that the principal effect is due to analogous conditions in the tuning fork itself. To understand the analogy between the relations in an electrical oscillatory circuit and the relations in a mechanically vibrating tuning fork, it is only necessary to recall that the functions of resistance, inductance and capacity in an electrical circuit are reproduced in a tuning fork as those of viscosity, moment of inertia and elasticity, respectively. These three quantities occur in the various equations expressing the mechanical characteristics of a tuning form in much the same manner as the three electrical quantities mentioned occur in the corresponding equations of an electrical circuit and accordingly the decrement of a tuning fork depends on the viscosity in the same way as electrical decrement depends on resistance. The coefficient of viscosity has been defined as the work required to move a surface of a unit cube of a substance in the direction of its own plane for a unit of time at unit velocity, a relation identically the same as that of the coefficient of resistance, or resistivity, of a conductor. The viscosity of a substance or material accordingly may be considered as the measure of its internal resistance, or of the energy absorbed in internal friction. It seems probable that, in the present case, the viscosity varies with the amplitude of vibration in much the same way as the effective resistance in an electrical circuit varies with the strength of an alternating current. The decrease of decrement of the transmission system, which attends the decrease in exciting current or input energy, largely results from the decreased amplitude of vibration caused thereby inasmuch as the decrease of current flowing in the circuits associated with the tuning fork was insufficient alone as derived from other considerations to account for the major portion of the result.

While the invention has been disclosed as embodied in a preferred arrangement, it will be obvious that the general principles thereof may be embodied in many other organizations, widely different from those illustrated, without departing from the spirit of the invention, as defined in the following claims.

What is claimed is:

1. A frequency selective transmission system comprising in combination a tuning fork, an electromagnet related thereto in energy transfer relation whereby current variations in the winding of said electromagnet cause proportional force variations to be impressed upon said fork, a source of electrical oscillations having the same frequency as the free vibrations of said tuning fork connected to the winding of said electromagnet, a polarized electromagnet also related to said fork in energy transfer relation whereby motional variations of said fork are caused to impress proportional electromotive force in the winding of said second electromagnet, an energy utilizing circuit connected to the winding of said second electromagnet, and magnetic shielding means substantially enclosing one of said electromagnets, whereby said utilization circuit and the circuit containing said source of electrical oscillations are maintained to a high degree electrically mutually independent.

2. A frequency selective transmission system comprising in combination two mutually independent closed tuned circuits each having the same natural period of vibration, a mechanical vibratory element having the same natural period of vibration as that of said circuits, separate electromagnetic coupling means between said vibratory element and each of said circuits respectively, and magnetic shielding means substantially enclosing one of said electro-magnetic coupling means, said vibratory element being the sole channel for the transfer of energy between said circuits.

In witness whereof, I hereunto subscribe my name this 3rd day of January A. D., 1922.

JOSEPH W. HORTON.